Figure 1:
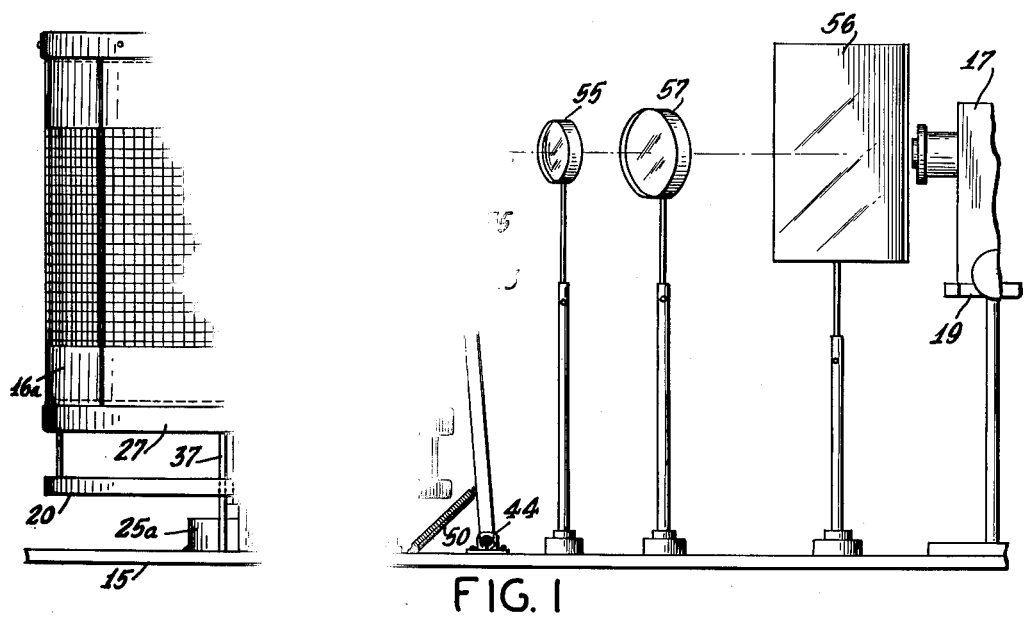
Figure 2:
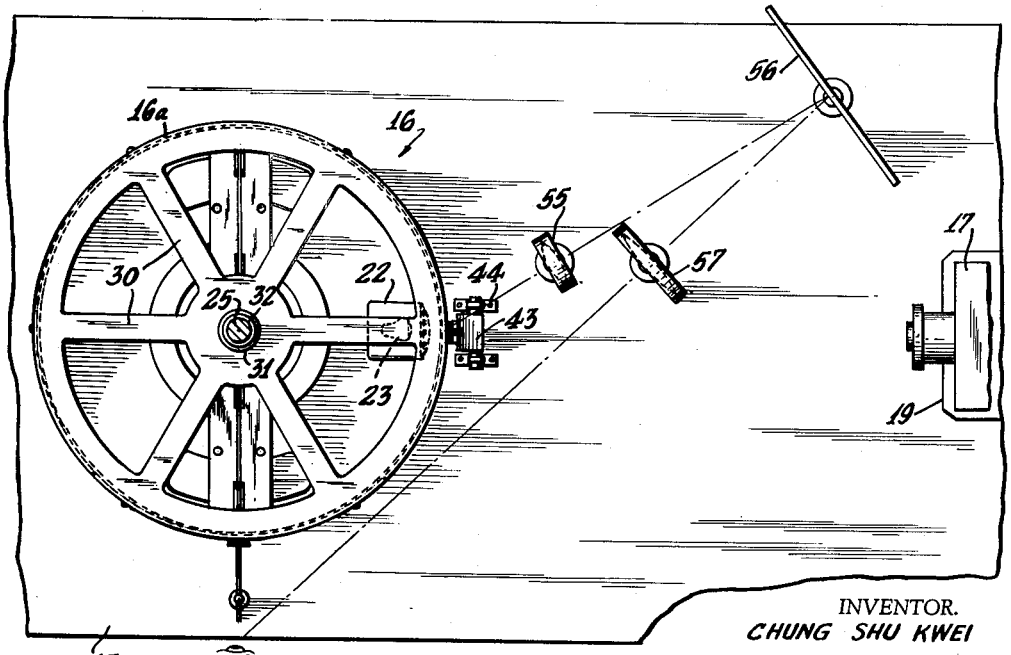

Oct. 23, 1962  E. WÄLLI  3,059,537
TRANSPARENT BUILDING ELEMENT
Filed Sept. 1, 1959
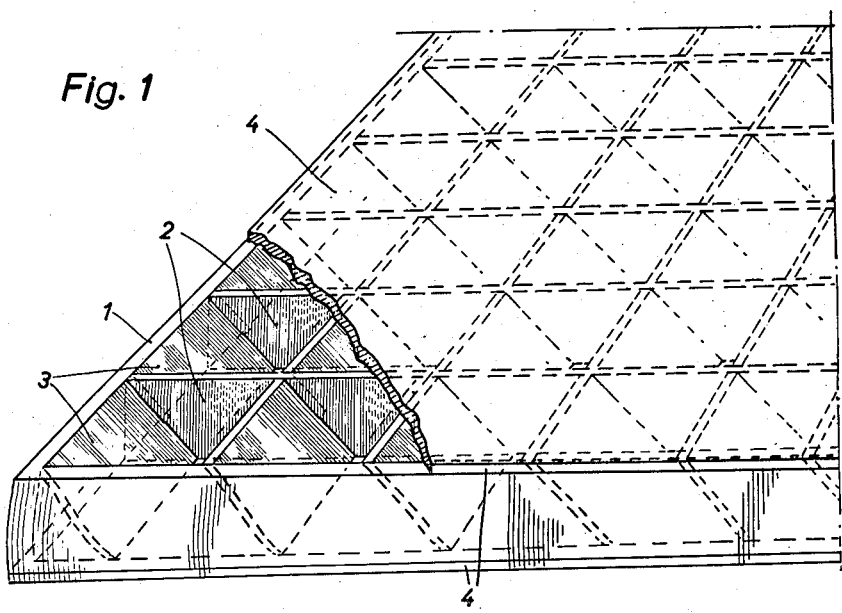
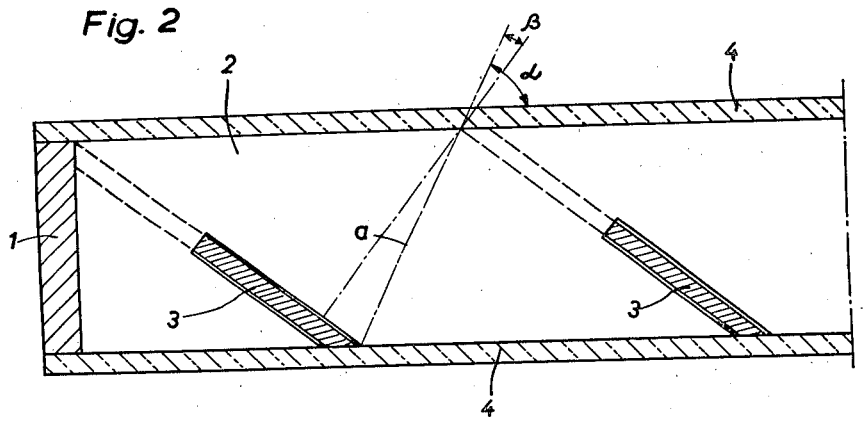

3,059,554

7 Sheets-Sheet 1

INVENTOR.
CHUNG SHU KWEI

BY
Davis, Hoxie, Faithfull & Hapgood
ATTORNEYS.